(12) United States Patent
Molinari (10) Patent No.: US 8,877,110 B2
(45) Date of Patent: Nov. 4, 2014

(54) METHOD OF MOLDING A SINGLE-PIECE HOLLOW SHELL INCLUDING PERFORATIONS

(75) Inventor: Arthur Molinari, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 326 days.

(21) Appl. No.: 13/484,193

(22) Filed: May 30, 2012

(65) Prior Publication Data

US 2013/0161876 A1    Jun. 27, 2013

Related U.S. Application Data

(60) Provisional application No. 61/580,537, filed on Dec. 27, 2011.

(51) Int. Cl.
*B29C 45/14* (2006.01)

(52) U.S. Cl.
USPC ............................ 264/259; 264/313; 264/267

(58) Field of Classification Search
None
See application file for complete search history.

(56) References Cited

U.S. PATENT DOCUMENTS

| | | |
|---|---|---|
| 701,737 A | 6/1902 | Kempshall |
| 701,741 A | 6/1902 | Kempshall |
| 704,882 A | 7/1902 | Kempshall |
| 705,249 A | 7/1902 | Kempshall |
| 705,359 A | 7/1902 | Matitsch |
| 705,764 A | 7/1902 | Kempshall |
| 1,482,232 A | 1/1924 | Hazeltine |
| 1,691,672 A | 11/1928 | Riddell |
| 2,181,350 A | 11/1939 | Smith |
| 2,319,163 A | 5/1943 | Slovin |
| 3,959,872 A | 6/1976 | Abe |
| 4,212,621 A | 7/1980 | Michelotti |
| 5,147,657 A | 9/1992 | Giza |
| 5,150,906 A | 9/1992 | Molitor et al. |
| 5,480,155 A | 1/1996 | Molitor et al. |
| 5,858,295 A | 1/1999 | McDowell |
| 6,102,815 A | 8/2000 | Sutherland |
| 6,383,091 B1 | 5/2002 | Maruko et al. |
| 6,461,461 B2 | 10/2002 | Kennedy, III |
| 6,929,567 B2 | 8/2005 | Sullivan et al. |
| 6,978,976 B2 | 12/2005 | Duquette et al. |
| 6,991,561 B2 | 1/2006 | Nesbitt et al. |
| 7,718,107 B2 | 5/2010 | Endo et al. |
| 2004/0030402 A1 | 2/2004 | Arnin et al. |
| 2008/0018020 A1 | 1/2008 | Wilson et al. |
| 2010/0151966 A1 | 6/2010 | Sato et al. |
| 2011/0081437 A1 | 4/2011 | Felker |

FOREIGN PATENT DOCUMENTS

| | | |
|---|---|---|
| KR | 20020046026 | 6/2002 |
| WO | WO9802213 | 1/1998 |

OTHER PUBLICATIONS

International Search Report and the Written Opinion of the International Searching Authority in connection with International Patent Application No. PCT/US2012/071618 mailed on May 30, 2013; 12 pages.

*Primary Examiner* — Monica Huson (74) *Attorney, Agent, or Firm* — Honigman Miller Schwartz and Cohn, LLP; Anna M. Budde (57) ABSTRACT

A method of making a single-piece hollow shell is disclosed. A plurality of perforators is inserted into a mold and create an inner mold surface. A material is inserted into the mold to create a perforated hollow shell between the mold, the inner mold surface, and the perforated.

20 Claims, 9 Drawing Sheets

METHOD OF MOLDING A SINGLE-PIECE HOLLOW SHELL INCLUDING PERFORATIONS

CROSS-REFERENCE TO RELATED APPLICATION

This application claims priority under 35 U.S.C. §119(e) to U.S. Provisional Patent Application No. 61/580,537, entitled "Method of Molding a Single-Piece Hollow Shell Including Perforations", and filed on Dec. 27, 2011, which application is hereby incorporated by reference.

FIELD

The present disclosure relates generally to a method of making a hollow shell. More specifically, the present disclosure relates generally to a method of making a hollow shell that is integrally made in one piece and that includes perforations therethrough. The single-piece hollow shell may then be incorporated into a golf ball.

BACKGROUND

There are a variety of methods available for creating a hollow shell. In many cases, for example with many outdoor balls, two halves are made independently and then are joined together along a seam. Such a process of making a shell may allow for one half to be made very inexpensively with no added features and only the other half needs to have any sort of specialized additions, such as a valve to allow air in, where the ball is designed to be inflated. In other examples, such as a traditional hard plastic ball or wiffle ball, the two halves are joined along a seam and the two halves may be identical.

However, it is not always desirable to have a seam on a shell. In such an event, there are several conventional methods of making a single piece hollow shell.

In a first embodiment, a wax or other meltable structure is used on the inside of the mold. The wax structure is placed in the mold and the material to make the shell is poured in around the wax. A perforation or hole remains in the shell after molding, so that a heating implement can be inserted into the wax to cause it to melt and drain from the shell. In using such a system, the mold temperature necessary to mold the shell of the desired material is considered to determine whether the use of wax or another temporary material to create the mold inner surface is feasible. Alternative ways of doing a similar method include using a fluid filled bladder, where the fluid is drained after molding, and the insertion of a cannula that blows air at a sufficient force to force the molding material away from the end of the cannula and towards the mold walls to create a cavity.

In other instances, a blow molding process may be used to create a hollow article. Such a system again has limited application, as only certain types of resins are compatible with blow molding. In addition, if the desired final shape has a plurality of holes, blow molding may create a less optimal result, as it is typically used when a continuous surface is desired.

The use of a perforated single-piece hollow shell structure is particularly desirable in the context of a golf ball. In some instances, the use of two halves of a material being joined along a seam is not desirable. Regardless of the joining method, the use of a seam can create a discontinuity within the ball. This discontinuity can create additional stresses to the ball on impact. In other cases, it can negatively affect the flight path of the ball when it is struck at particular angles relative to the seam. The use of a perforated layer in a golf ball can help in creating a golf ball with multiple integrally-formed layers that can be secured to one another mechanically, rather than chemically, thereby improving the recyclability of the inner layers of the ball.

The previously developed structures and methods do not provide a method of making a single-piece hollow shell with a plurality of perforations therethrough. In addition, such methods may limit the resins available for forming the hollow shell. Accordingly, a method of forming a hollow shell with perforations therethrough that may be made with a variety of resins is desirable. It is also desirable to develop a golf ball incorporating such a hollow structure.

SUMMARY

Various methods for making a perforated hollow sphere or shell are disclosed. A mold having a first mold surface is provided. At least one perforator is inserted into the mold. An inner mold surface creator is actuated to move an expansion area to an expanded position and to create at least a portion of an inner mold surface. A first material is inserted between the first mold surface and the inner mold surface. The first material may then be cured and the inner mold surface creator and perforator retracted. The formed perforated hollow sphere may then be ejected from the mold. If multiple perforations are desired, multiple perforators may be used.

In another embodiment, a mold having an inner surface is provided. A plurality of perforators is inserted into the mold. Each perforator has a free end sized and shaped to contact a free end of another adjacent perforator. A material is then inserted into the mold. The material may be cured and the perforators removed from the mold, at which time the single-piece hollow sphere can be removed from the mold. The free ends may be sized and shaped to interfit with one another to be capable of creating a polygonal or spherical void in the shell formed by the mold.

In another embodiment, a method of making a golf ball is disclosed. The method includes providing a mold with a first mold surface. Perforators are then inserted into the mold. The perforators cooperate to form a second mold surface spaced from the first mold surface. A first material is inserted into the mold between the first mold surface and the second mold surface. The material is cured, thereby forming a single-piece perforated hollow shell. The shell may then be inserted into a second mold and a second material is inserted into the second mold to interfit with the shell and form a golf ball inner part. The golf ball inner part may then be inserted into a third mold and covered with a golf ball cover.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
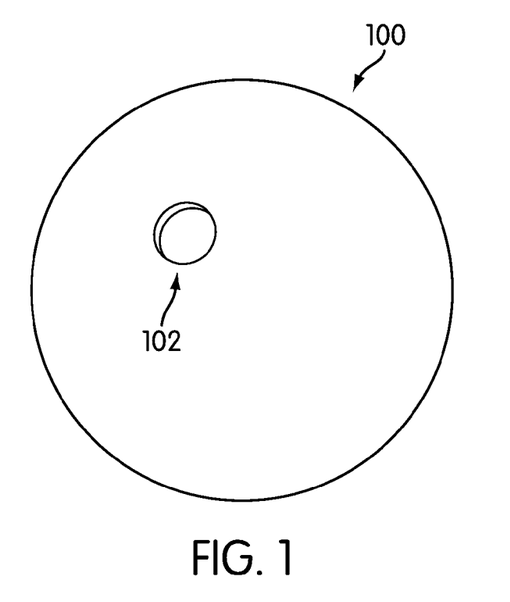
FIG. 1 is a perspective view of a simplified shell having one perforation.
Figure 2:
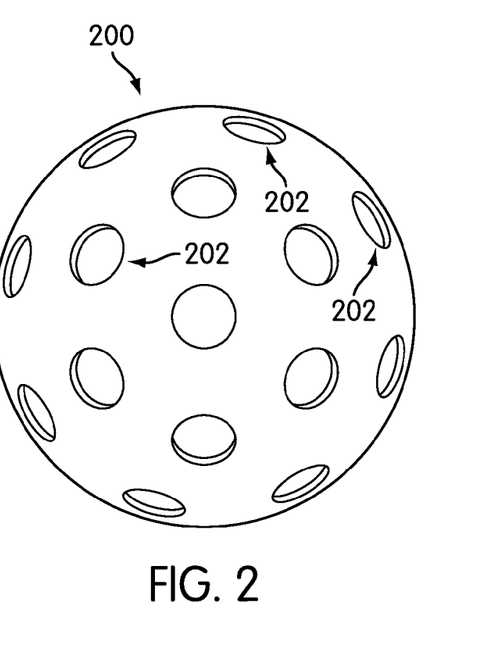
FIG. 2 is a perspective view of a shell having a plurality of perforations therethrough.

FIGS. 1 and 2 show exemplary hollow spheres that may be used in connection with the present disclosure. FIG. 1 shows a hollow sphere 100. Hollow sphere 100 defines at least one perforation 102 therethrough. The methods disclosed herein could be used to create a hollow sphere such as hollow sphere 100 with a single perforation 102 or very few perforations around hollow sphere 100. However, in many embodiments, it is more desirable to create a hollow sphere such as hollow sphere 200 in FIG. 2. Hollow sphere 200 defines a plurality of perforations 202 therethrough. The number of perforations desirable in any particular further application of the shell, such as in a golf ball application, can be determined easily by a person having ordinary skill in the art. A person having ordinary skill in the art may make this determination based on the final use for the hollow shell.

In the present disclosure, the terms sphere and shell are used substantially interchangeably. In most molding situations, it is difficult to mold a precise sphere, and in many cases, there is no need to have a perfectly spherical shell for commercial use. Accordingly, the present disclosure relates to shells that may or may not be spherical. In some embodiments, it is envisioned that a shell having a non-spherical profile may be useful in some contexts. Accordingly, even if a shape is shown a substantially spherical and is described in this disclosure as being a sphere or spherical, it is understood that a substantially spherical or non-spherical shell may be equivalent in many contexts.

In order to create the perforations in the hollow shell, a perforator may be used. In general, as described in greater detail herein, the perforators of the present invention assist in the creation of the perforations in the hollow shell by acting as a movable molding surface. In other words, the perforators block the melt injected by an injection molding machine when in a first position, but are retractable to a second position to leave a void in the molded article. While in many of the embodiments described herein the perforators are injection nozzles, various embodiments of perforators are disclosed herein and a person having ordinary skill in the art can select from among the available perforators disclosed or can select an alternative perforator that is equivalent to those disclosed.

Figure 3:
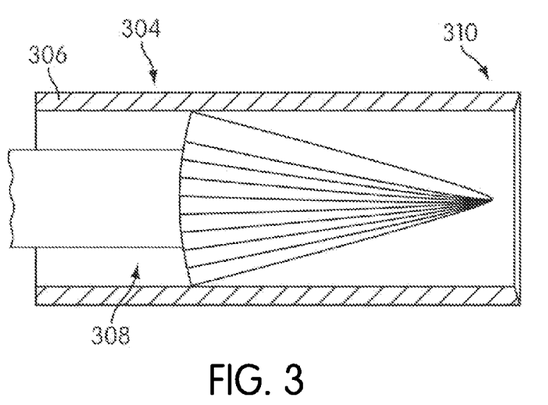
FIG. 3 is a view, partially in section, of an inner mold surface creator in retracted form.
Figure 4:
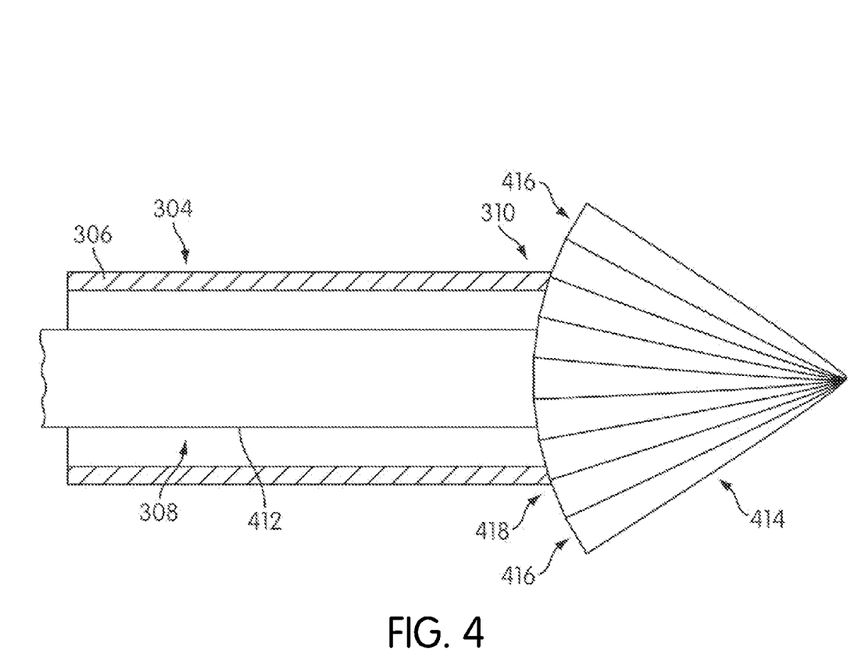
FIG. 4 is a view, partially in section, of one exemplary embodiment of an inner mold surface creator in expanded form.
Figure 5:
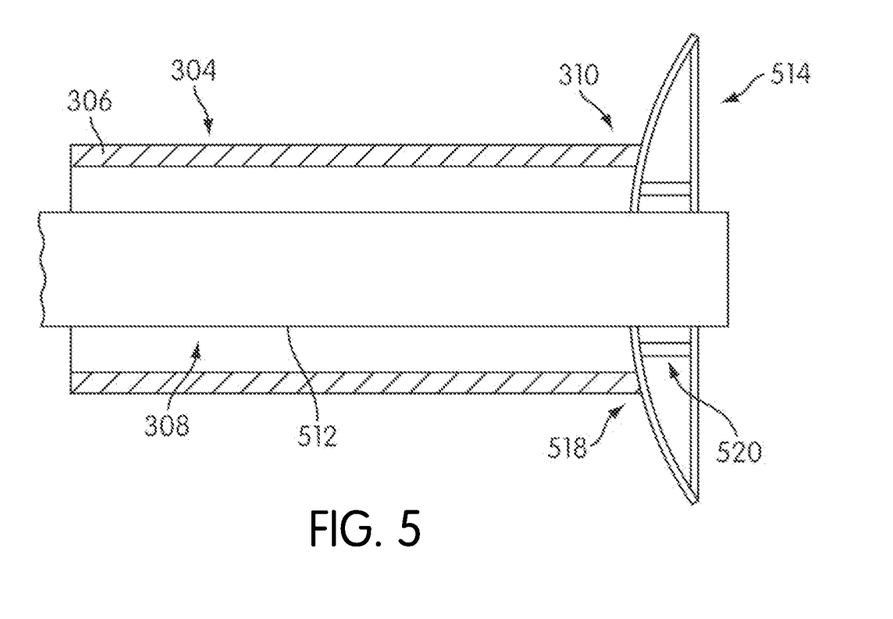
FIG. 5 is a view, partially in section, of another exemplary embodiment of an inner mold surface creator in expanded form.

FIG. 3 shows a first embodiment of a perforator 304. Perforator 304 includes a hollow tube 306. Hollow tube 306 can be inserted into or removed from a mold (not shown in this FIG.). Hollow tube 306 contains inner mold surface creator 308. Inner mold surface creator 308 may be slidable within hollow tube 306 to move from a retracted position as shown in FIG. 3 to an active position as shown in FIGS. 4 and 5. Alternatively, inner mold surface creator 308 may be permanently positioned outside of free end 310 of perforator 304 and only various actuating mechanisms and links may be present within hollow tube 306, as will be described in greater detail below. As will be better understood in conjunction with this later disclosure, if inner mold surface creator 308 is positioned permanently outside of free end 310 of perforator 304, inner mold surface creator 308 desirably has a compressed position and an expanded position. Because inner mold surface creator 308 is positioned and removed from a mold and molded hole or perforation through the hole or perforation created by the perforator 304, the compressed position of the inner mold surface creator 308 compresses inner mold surface creator 308 to a dimension where inner mold surface creator 308 can be removed from the mold through the perforation with perforator 304.

Inner mold surface creator 308 can take a number of forms and can be actuated in a number of ways with varying structures. As shown in FIG. 4, inner mold surface creator 308 includes an actuator 412 and an expansion area 414. When it is desired that inner mold surface creator 308 form the inner mold surface, inner mold surface creator 308, if necessary, is extended through free end 310 of perforator 304. Inner mold surface creator 308 is desirably extended or positioned so that expansion area 414 is permitted to expand out from free end 310 of perforator 304.

Once expansion area 414 is free from constraints from free end 310, expansion area 414 is actuated to attain its expanded position as shown in FIG. 4. In some instances, for example, expansion area 414 may be actuated by a spring (not shown) that automatically moves expansion area 414 from its compressed position to its expanded position when it leaves free end 310. Alternatively, expansion area 414 could be actuated by a variety of mechanical or electrical actuators. For example, actuator 412 may be a threaded bolt and the arms of expansion area 414 move outwardly when actuator 412 is rotated one direction and move inwardly when actuator 412 is rotated the other direction. Alternatively actuator may comprise electrical wiring that actuates an electrical switch within expansion area 414 to move each arm of expansion area 414 outwardly.

The expansion area shown in FIG. 4 can be considered to be a generally umbrella or wedge shaped section. However, it is desirable for there to be material linking the outer surface of expansion area 414 with actuator mechanism 412 or free end 310 of perforator 304. As will be discussed later, the inner mold surface creator 308 forms a mold surface. Accordingly, the surface 416 should be a resilient or solid surface that can withstand the weight or force from the material and equipment used in the molding process. Because of the desirability that expansion area 414 and hollow tube 306 mate against each other, it may be desirable in some instances for hollow tube 306 to have a curved or beveled profile 418 at free end 310 to allow hollow tube 306 to properly mate with expansion area 414 and may further include a seal or other resilient material to further enhance the mating.

An alternative embodiment of inner mold surface creator 508 is shown in FIG. 5. FIG. 5 shows an actuator 512 in hollow tube 306 ending in expansion area 514. Expansion area 514 may function generally like a molly bolt. When expansion area 514 clears free end 310 of hollow tube 306, a threaded actuator 512 can be tightened to fold expansion area 514 towards hollow tube 316. When the desired position is reached, which may be signaled by the engagement of expansion area 514 against stop 520, expansion area 514 is pulled against free end 310 of hollow tube 316. In order to facilitate the mating of expansion area 514 and hollow tube 306, free end 310 may be beveled or curved as at 518 to conform in shape to expansion area 514 and may further include a seal or other resilient member to assist in the mating.

Figure 6:
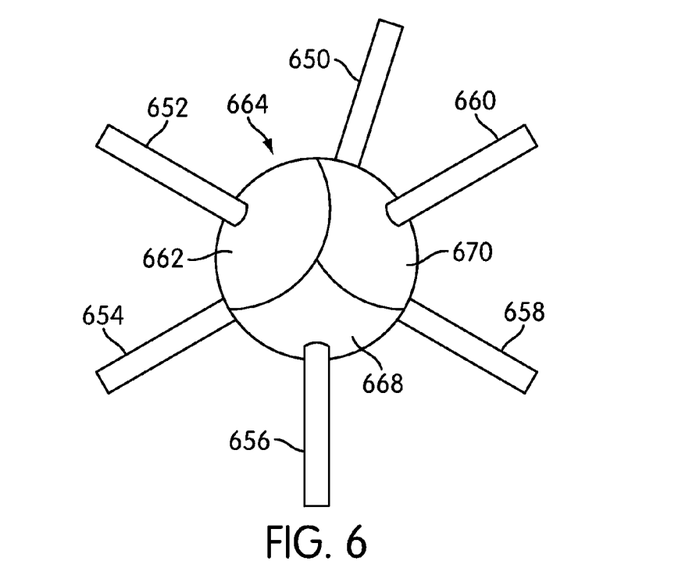
FIG. 6 is a perspective view of a plurality of the inner mold surface creators of FIG. 5 placed adjacent one another to form an inner mold surface.
Figure 7:
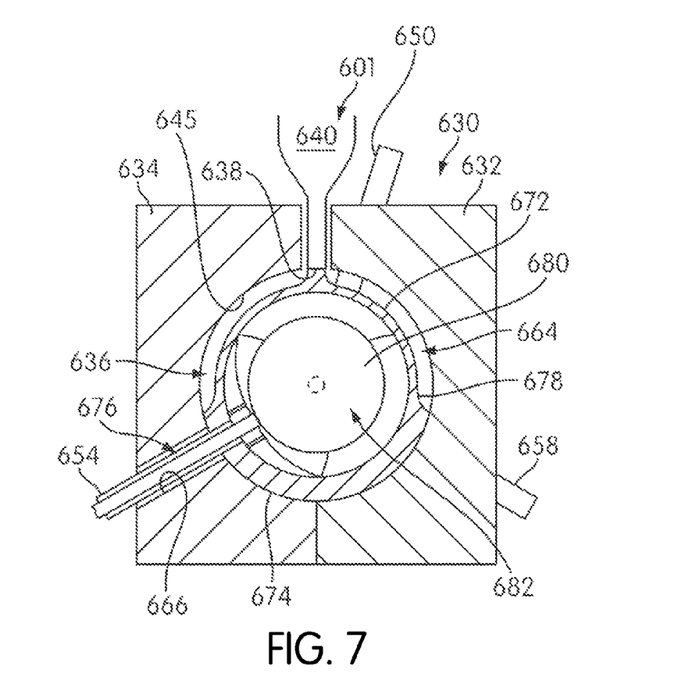
FIG. 7 is a sectional view of the structure of FIG. 6 in position within a mold.

FIGS. 6 and 7 show the cooperation of a plurality of inner mold surface creators to create an inner mold surface. FIG. 6 shows the plurality of inner mold surface creators by itself for clarity and FIG. 7 shows them positioned in a mold.

Throughout the figures, the molds, nozzles, and parts are in exemplary configurations. In some embodiments, these configurations may be altered. For example, in the figures, the seam lines of the molds are oriented to that the molds will separate by moving to the sides (in a horizontal direction), while the nozzle is positioned at the top of the mold. As will be apparent to those in the art, the molds and nozzle may be re-oriented so that the mold halves will separate by lifting one mold half away from the other or moving both halves away from each other (in a vertical direction) while the nozzle will inject from a side of the mold. The orientation of the mold halves with respect to each other and/or the nozzle and/or the part may be shifted without undue experimentation.

As shown in FIGS. 6 and 7, a mold 630 is provided. Mold 630 may be one of a variety of types of molds, depending on the material to be molded therein. In FIG. 7, first mold 630 is shown as a standard injection mold. First mold 630 may include first mold portion 632 and second mold portion 634. First mold portion 632 and second mold portion 634 can be separated from one another to place items in first mold 630 before molding occurs or to remove the formed material after molding. First mold portion 632 and second mold portion 634 form first mold cavity 636 therein. First injection port 638 may be present, for example, at the top of first mold cavity 636. First injection port 638 may be in fluid communication with first reservoir 640 that contains first material 601. In some embodiments, first material 601 may be a natural or synthetic rubber. First material 601 may be introduced into first mold cavity 636 from first reservoir 640 via first injection port 638. First mold 630 includes first mold inner surface or wall 645. Inner surface 645 defines the outer shape of the item to be molded therein, as is typical of molds.

A plurality of perforators are inserted into mold 630. In the embodiment shown in FIGS. 6 and 7, various perforators are partially or completely visible. These include first perforator 650, second perforator 652, third perforator 654, fourth perforator 656, fifth perforator 658, and sixth perforator 660. In the sectional view of FIG. 7, first perforator 650, second perforator 652, fourth perforator 656, and sixth perforator 660 are not visible. Each perforator is inserted into a hole in mold 630. In the section taken in FIG. 7, only one hole 666 is visible and shows the insertion of third perforator 654 into mold cavity 636.

Once each perforator is inserted into mold cavity 636, each inner mold surface creator is actuated to form its portion of the inner mold surface. Only some of the inner mold surfaces thus created are visible in FIGS. 6 and 7. As shown in FIG. 6, the inner mold surface creator for second perforator 652 has been actuated and creates second portion 662 of inner mold surface 664. Similarly, the inner mold surface creator for fourth perforator 656 has been actuated and creates fourth portion 668 of inner mold surface 662. Similarly, the inner mold surface creator for sixth perforator 660 has been actuated and creates sixth portion 670 of inner mold surface 664.

In the view shown in FIG. 7, these inner mold surface portions are not visible. Instead, first inner mold surface portion 672, created by the action of first perforator 650 inner mold surface creator, third inner mold surface portion 674, created by third perforator 654 inner mold surface creator 676 shown in this FIG., and fifth inner mold surface portion 678 created by fifth perforator 658 inner mold surface creator are visible. It is noted that as discussed earlier in the disclosure, actuation of the inner mold surface creator causes the expansion area to expand and form a portion of the inner mold surface. Also visible is a seventh inner mold surface portion 680 that is created by a perforator and actuator that are not visible in this FIG.

The various inner mold surface portions need not be the same shape. In fact, in many embodiments, the inner mold surface portions will differ in shape. In FIGS. 6 and 7, it is noted that many of the edges of the inner mold surface portions are rounded. It may be desirable in some embodiments to use rounded edges. In other embodiments, other types of edges, such as a straight edge or a beveled edge may be used. However, the plurality of perforators that are selected are typically selected and arranged in a manner so that when the corresponding expansion area for each corresponding perforator is actuated to move to its expanded position, the corresponding expansion areas form corresponding inner mold surfaces that abut one another to together form a substantially continuous inner mold surface. As shown in FIGS. 6 and 7, it may be desirable for inner mold surface 664 to be substantially spherical.

In the embodiment shown in FIGS. 6 and 7, an inner mold surface creator similar to that shown in FIGS. 3 and 5 is shown. If such an inner mold surface creator is used, it will tend to create a substantially hollow area 682 within inner mold surface 664.

Figure 8:
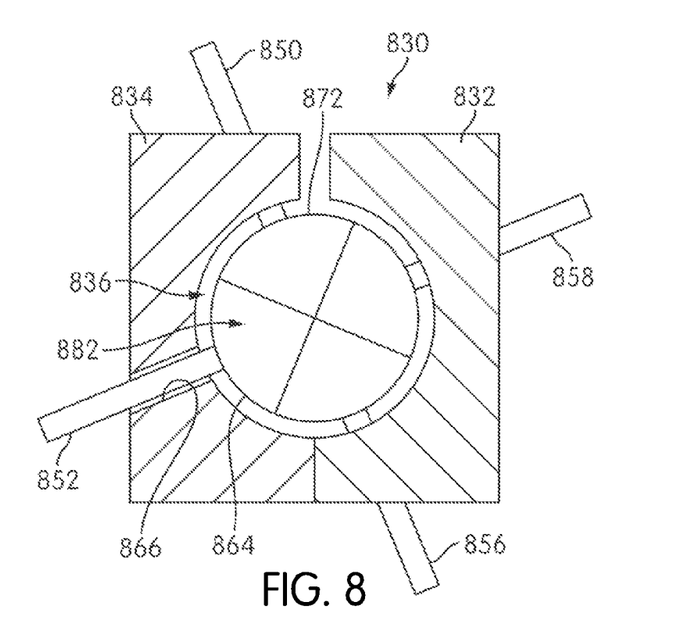
FIG. 8 is a sectional view of a plurality of the inner mold surface creators of FIG. 4 in position within a mold.

An alternative embodiment is shown in FIG. 8. In FIG. 8, an inner mold surface creator similar to that shown in FIGS. 3 and 4 is shown. If such an inner mold surface creator is used, it will tend to create a filled area 882 within inner mold surface 864. While FIG. 8 does not show a FIG. corresponding specifically to FIG. 6, the outward appearance of the perforators and inner mold surface from the outside of the mold or in non-sectional view is likely to be substantially the same whether an inner mold surface creator like that shown in FIG. 4 is used or whether one like that shown in FIG. 5 is used. The embodiment of FIG. 8 is also shown in FIG. 9 along with other equipment.

Figure 9:
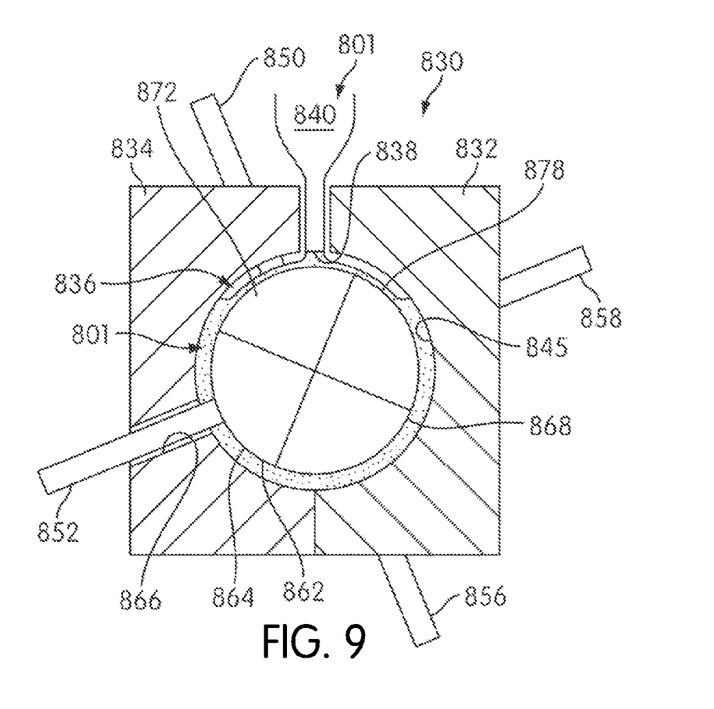
FIG. 9 is the sectional view of FIG. 8 showing a material injection step.

As shown in FIGS. 8 and 9, a mold 830 is provided that is a first mold that corresponds to first mold 630 described in connection with FIGS. 6 and 7. Because they are substantially the same mold and are used in different embodiments in the same first molding step, both mold 630 and mold 830 are referred to as a first mold. Mold 830 may be one of a variety of types of molds, depending on the material to be molded therein. In FIGS. 8 and 9, first mold 830 is shown as a standard injection mold. First mold 830 may include first mold portion 832 and second mold portion 834. First mold portion 832 and second mold portion 834 can be separated from one another to place items in first mold 830 before molding occurs or to remove the formed material after molding. First mold portion 832 and second mold portion 834 form first mold cavity 836 therein. First injection port 838 may be present, for example, at the top of first mold cavity 836. First injection port 838 may be in fluid communication with first reservoir 840 that contains first material 801. In some embodiments, first material 801 may be a natural or synthetic rubber. First material 801 may be introduced into first mold cavity 836 from first reservoir 840 via first injection port 838. First mold 830 includes first mold inner surface or wall 845. Inner surface 845 defines the outer shape of the item to be molded therein, as is typical of molds.

A plurality of perforators are inserted into mold 830. In the embodiment shown in FIGS. 8 and 9, various perforators are partially or completely visible. FIGS. 8 and 9 show first perforator 850, second perforator 852, third perforator 856, and fourth perforator 858. Each perforator is inserted into a hole in mold 830. In the section taken in FIGS. 8 and 9, only one hole 866 is visible and shows the insertion of second perforator 852 into mold cavity 836.

Once each perforator is inserted into mold cavity 836, each inner mold surface creator is actuated to form its portion of the inner mold surface. Only some of the inner mold surfaces thus created are visible in FIGS. 8 and 9. In FIGS. 8 and 9, the inner mold surface creator for first perforator 850 has been actuated and creates first portion 872 of inner mold surface 864. Similarly, the inner mold surface creator for second perforator 852 has been actuated and creates second portion 862 of inner mold surface 864. Similarly, the inner mold surface creator for third perforator 856 has been actuated and creates third portion 868 of inner mold surface 864. Finally, the inner mold surface creator for fourth perforator 858 has been actuated and creates fourth portion 878 of inner mold surface 864.

The various inner mold surface portions need not be the same shape. In fact, in many embodiments, the inner mold surface portions will of necessity differ in shape. It may be desirable in some embodiments to use rounded edges. In other embodiments, a straight edge may be used. However, the plurality of perforators that are selected are typically selected and arranged in a manner so that when the corresponding expansion area for each corresponding perforator is actuated to move to its expanded position, the corresponding expansion areas form corresponding inner mold surfaces that abut one another to together form a substantially continuous inner mold surface. As shown in FIGS. 8 and 9, it may be desirable for inner mold surface 864 to be substantially spherical.

As noted above, among the first steps in creating a single-piece hollow perforated sphere is to provide a first mold, such as first mold 630 or first mold 830. Then, a desired plurality of perforators are inserted into the first mold 630 or first mold 830. Then, an inner mold surface creator corresponding to an individual perforator is actuated to expand an expansion area associated with each individual perforator. These perforators and expansion areas are selected, arranged, designed, and positioned such that when the expansion areas are in their corresponding expanded positions, each expansion area desirably forms a portion of the inner mold surface. The expansion areas desirably abut one another and form a substantially continuous inner mold surface, such as inner mold surface 664 or inner mold surface 864. Once these steps have taken place, the steps shown in FIGS. 9 and 10 may take place. While the steps illustrated may be described in connection with the embodiment shown in FIG. 8, the embodiment shown in FIGS. 6 and 7 or an equivalent structure could be used in the same manner to create a similar or identical result.

As noted earlier, first material 801 may be positioned in first reservoir 840. First reservoir 840 is in fluid communication with first mold cavity 836 through first injection portion 838. After inner mold surface 864 has been created and positioned in first mold cavity 836, first material 801 is inserted into mold 830 between first mold surface 845 and inner mold surface 864. First material 801 is selected from a variety of materials that are capable of being molded within mold 830 and that are capable of forming between first mold surface 845 and inner mold surface 864 and flowing and forming around the various perforators, such as exemplary perforator 852, positioned within the mold.

FIG. 9 shows an intermediate time of this step before first material 801 has completely filled the gap between first mold surface 845 and inner mold surface 864. A person having ordinary skill in the art will understand that first material 801 will continue to fill the available portion of mold 830 until it has been filled. First material 801 may then be cured or allowed to cure. Various materials that are appropriate for use in the present embodiments have different curing requirements. If a thermosetting resin is used as the first material, the curing process often requires the mold to be heated after it is filled. If a thermoplastic resin is used as the first material, the curing process often requires the mold to be cooled after it is filled. Other materials might simply require the passage of time to cure.

Figure 10:
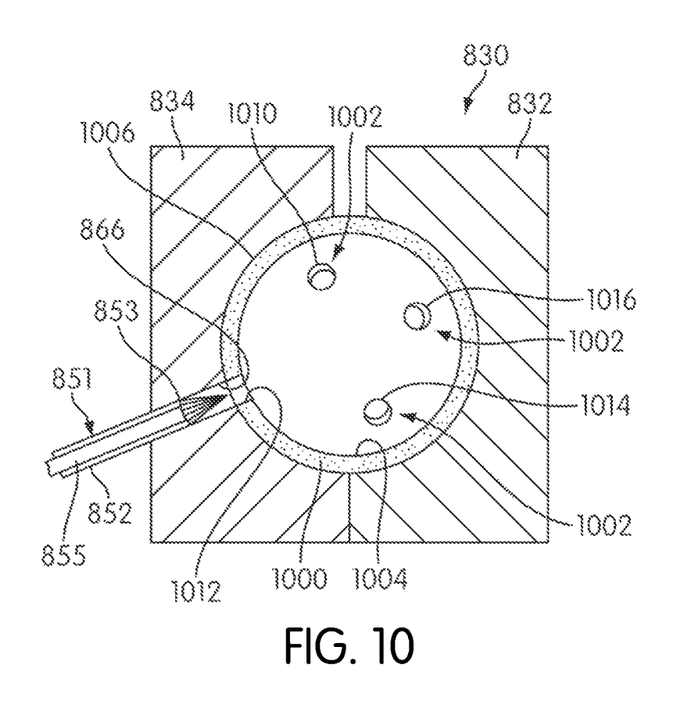
FIG. 10 is the sectional view of FIG. 9 after the material has been cured and after the inner mold surface creators have been retracted.

After first material 801 is cured, the perforators are retracted from mold 830. As shown in FIG. 10, first perforator 850, third perforator 856, and fourth perforator 858 have been removed from mold 830. As also shown in FIG. 10, second perforator 852 is about to be removed from mold 830. Before second perforator 852 can be removed, the inner mold surface creator may be actuated again in order to cause the retraction of the expansion area into its retracted position. FIG. 10 shows expansion area 853 of second perforator 852 in its retracted position being able to be removed or retracted from mold 830 through hole 866 after actuator 855 has been actuated to cause retraction of the expanded area. Once that retraction has taken place, perforator 852, along with its component parts, including inner mold surface creator 851, including expansion area 853 and actuator 855, can be removed from mold 830 through hole 866.

After each perforator has been removed, first mold portion 832 and second mold portion 834 may be moved away from one another to eject hollow sphere 1000 from mold 830. Hollow sphere 1000 in FIG. 10 is shown in cross-section, but in the complete mold, hollow sphere 1000 will have been formed in a single piece without any seam lines. Four perforations 1002 are shown in the portion of hollow sphere shown in FIG. 10 and may be the only substantial discontinuities in the inner surface 1004 or outer surface 1006 of single-piece hollow sphere 1000. These include first perforation 1010, second perforation 1012, third perforation 1014, and fourth perforation 1016. Each perforation 1002 was formed from the positioning of a respective perforator and inner mold surface creator in an appropriate position within mold 1000 and extends between inner surface 1004 of hollow shell 1000 and outer surface 1006 of hollow shell 1000. As shown in FIG. 10, these perforations 1002 may be spaced unevenly, and any arrangement that allows the formation of an inner mold surface could be acceptable. A person having ordinary skill in the art will be able to position the perforators to create perforations in a desired location and will be able to design, select and arrange the perforators and their associated inner mold surface creators to create an analogous hollow sphere with the desired perforation pattern.

Figure 14:
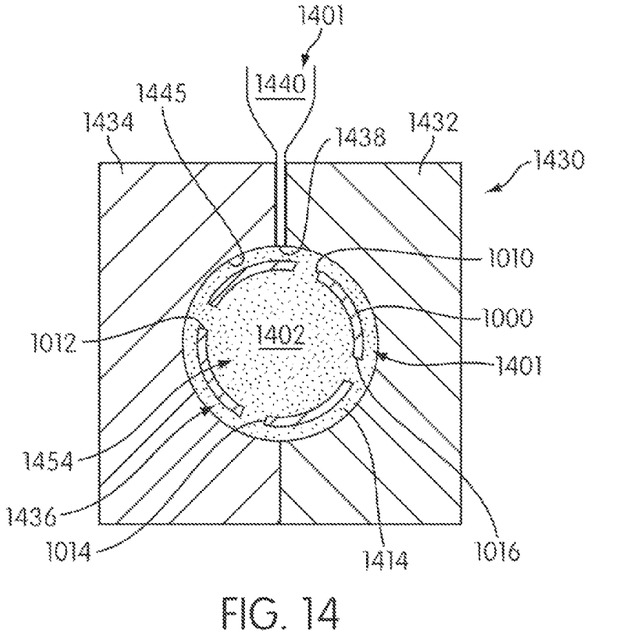
FIG. 14 is a cross-sectional view of a second mold containing the a hollow shell being incorporated into additional layers of a golf ball.
Figure 15:
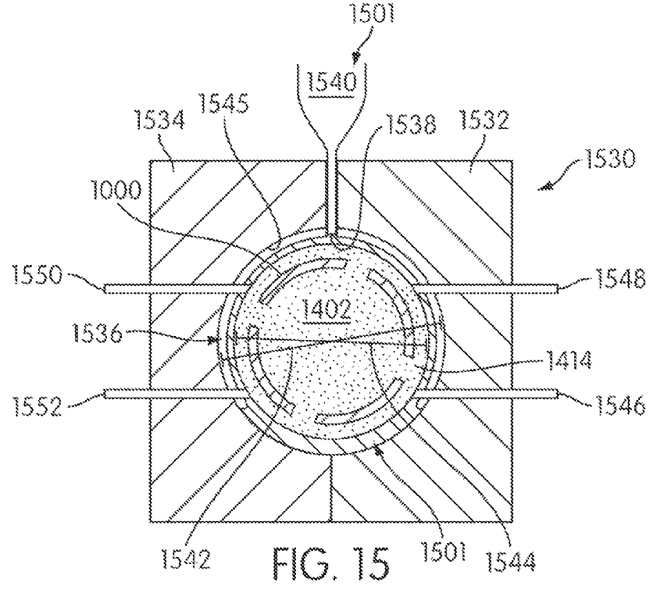
FIG. 15 is a cross-sectional view of a third mold containing the inner layers of the golf ball of FIG. 14 being covered by a golf ball cover.

FIGS. 14 and 15 show an exemplary embodiment of how single-piece hollow shell 1000 may be used. In the example shown in FIGS. 14 and 15, single-piece hollow shell 1000 is used in a method of making a golf ball. It is conceivable that a designer could use single-piece hollow shell 1000 in other methods to make other structures. Shell 1000 may desirably be used in any context where a single-piece hollow shell is desired for a variety of reasons. Shell 1000 may be useful in the process described in U.S. Patent Publication No. 2013/0165260 A1, currently Provisional Application Ser. No. 61/580,549 entitled Golf Ball With Co-Molded Core and Medial Layer and Method of Making, filed on Dec. 27, 2011, the disclosure of which is incorporated herein by reference.

As noted in FIG. 14, a golf ball can be molded using mold 1430. Mold 1430 may be one of a variety of types of molds, depending on the material to be molded therein. In FIG. 14, second mold 1430 is shown as a standard injection mold. Second mold 1430 may include first mold portion 1432 and second mold portion 1434. First mold portion 1432 and second mold portion 1434 can be separated from one another to place items in second mold 1430 before molding occurs or to remove the formed material after molding. First mold portion 1432 and second mold portion 1434 form second mold cavity 1436 therein. Second injection port 1438 may be present, for example, at the top of second mold cavity 1436. Second injection port 1438 may be in fluid communication with second reservoir 1440 that contains second material 1401. In some embodiments, second material 1401 may be a highly neutralized polymer or a thermoplastic urethane. Second material 1401 is introduced into second mold cavity 1436 from second reservoir 1440 via second injection port 1438.

Second mold 1430 may be heated or cold, depending on what material is used as second material 1401 and what its properties are. For example, if the material used is a thermosetting material, second mold 1430 may be heated so that the material is heated to its setting temperature. If, instead, the material is thermoplastic, second mold 1430 may only be heated to promote the even flow of second material 1401 into second mold cavity 1436 to ensure that second mold cavity 1436 is evenly filled. Other materials may allow second mold 1430 to remain at about room temperature during molding. After second material 1401 is treated in an appropriate manner to allow second material 1401 to be appropriately molded, second mold 1430 may be cooled or allowed to cool, if necessary. Once second mold 1430 reaches room temperature and the material is allowed to cure for the appropriate amount of time, the intermediate material formed by the molding process can be removed from second mold 1430. FIG. 14 shows one example of an appropriate structure for molding a golf ball inner part. However, this precise structure need not be used. Instead, another structure appropriate for molding the inner part could be used that is appropriate for the materials desired for the inner part.

FIG. 14 shows a first injection molding step. As shown in FIG. 14, second material 1401 is inserted into second mold 1430 via second injection port 1438 between the interior wall 1445 of second mold cavity 1436 and single-piece hollow shell 1000. In some embodiments, it may be desirable to align a perforation 1002 in shell 1000 with second injection port 1438 and to insert second injection port 1438 into cavity 1454 within shell 1000. In other embodiments, it may be desirable to align a perforation 1002 with second injection port 1438 but to keep second injection port 1438 between shell 1000 and interior wall 1445 of second mold cavity 1436.

When second material 1401 is injected into second mold cavity 1436, it flows around shell 1000 and enters shell 1000 through at least one perforation 1002 therethrough. Second material 1401 may flow over shell 1000 and fall by gravity or other methods to the bottom of mold cavity 1436. While other orientations of the mold are possible, it is often desirable to use gravity to assist in the molding process, rather than needing to use additional pressure to force a molding material into a mold.

In FIG. 14, second mold cavity 1436 is substantially filled with second material 1401 and second injection port 1438 has been retracted to be about even with or recessed from interior wall 1445 of mold 1430 in order to allow second material 1401 to substantially fill mold cavity 1436. The injection step allows the filling of the interior 1454 of shell 1000. The injection step also allows each perforation 1002 to be filled with second material 1401. As shown in FIG. 14, first perforation 1010, second perforation 1012, third perforation 1014, and fourth perforation 1016 are all substantially filled with second material 1401. The use of such a method of molding allows the substantially simultaneous molding of a core 1402 and a medial layer 1414 partially separated from one another via a perforated single-piece hollow shell 1000. Such a method allows the integration of core 1402 and medial layer 1414 in a single molding process and minimizes shifting between core 1402 and medial layer 1414 due to this integration. The degree of integration will vary depending on the materials used and the number, size, and shape of perforations 1002 in shell 1000.

The integral molding of core 1402 and medial layer 1414 around and through shell 1000 is a mechanical interfitting of shell 1000 with core 1402 and medial layer 1414. This interfitting is well within the outer circumference or surface of the golf ball inner part formed by the process of FIG. 14 and minimizes or eliminates shifting between shell 1000, core 1402, and medial layer 1414. The mechanical interlitting also minimizes or eliminates the need for a chemical attachment of core 1402, shell 1000, and medial layer 1414. This elimination of a chemical attachment improves the ability of a golf ball inner part firmed in this manner to be recycled later. If first material 601 forming perforated single-piece hollow shell 1000 and second material 1401 forming core 1402 and medial layer 1414 have different properties, such as different densities, the golf ball inner part can be pulverized and first material 601 separated from second material 1401 for recycling without concern about any adhesive residue entering the recycling process. One example of a method of recycling a golf ball and a golf ball inner part made in this manner may be thund in U.S. Patent Publication No. 2013/0165267 A1, currently Provisional Application Ser. No. 61/580,525 entitled Method Of Recycling A Ball And Ball For Use In Recycling Method, filed on Dec. 27, 2011, the disclosure of which is incorporated herein by reference.

In describing the molding process, the terms fill and filling are used. A person having ordinary skill in the art will appreciate that these terms in many embodiments do not mean to completely fill a space. In some embodiments, the use of particular materials for a mold and a material to fill the mold may, for example, cause the material to spring back from the mold, particularly upon curing. Accordingly, some small gaps that are caused by such limitations are to be expected in any manufacturing process, and these gaps do not mean that the mold is not filled.

After mold cavity 1436 is substantially filled with second material 1401, second material 1401 may be cured, when necessary or desirable. Various materials that are appropriate for use in the present embodiments have different curing requirements. If a thermosetting resin is used as the first material, the curing process often requires the mold to be heated after it is filled. If a thermoplastic resin is used as the first material, the curing process often requires the mold to be cooled after it is filled. Other materials might simply require the passage of time to cure. After second material 1401 is cured, first mold portion 1432 and second mold portion 1434 are separated from one another and the golf ball inner part is removed from second mold 1430.

FIG. 15 shows the use of third mold 1530 to form a cover over the golf ball inner part formed in the step shown in FIG. 14. Third mold 1530 may be one of a variety of types of molds, depending on the material to be molded therein. In FIG. 15, third mold 1530 is shown as a standard injection mold. Third mold 1530 may include first mold portion 1532 and second mold portion 1534. First mold portion 1532 and second mold portion 1534 can be separated from one another to place items in third mold 1530 before molding occurs or to remove the formed material after molding. First mold portion 1532 and second mold portion 1534 form third mold cavity 1536 therein. Third injection port 1538 may be present, for example, at the top of third mold cavity 1536. Third injection port 1538 may be in fluid communication with third reservoir 1540 that contains third material 1501. In some embodiments, third material 1501 may be a thermoplastic urethane, such as SURLYN. Third material 1501 is introduced into third mold cavity 1536 from third reservoir 1540 via third injection port 1538. Although not shown in FIG. 15, the interior wall 1545 of third mold cavity 1536 may be patterned to mold the dimple pattern of the ball cover onto the ball cover in this step.

As shown in FIG. 15, one option for properly positioning medial layer 1414 in third mold cavity 1536 is to support medial layer 1414 with a plurality of pins. FIG. 15 shows the use of first pin 1546, second pin 1548, third pin 1550, and fourth pin 1552. First pin 1546, second pin 1548, third pin 1550, and fourth pin 1552 are designed to be retractable within third mold cavity 1536. As third material 1501 is injected into third mold cavity 1536, it fills third mold cavity 1536. As it begins to harden, it becomes capable of supporting medial layer 1414 within second mold cavity 1536. As third material 1501 begins to harden, first pin 1546 and fourth pin 1552 can be retracted. As third material 1501 begins to further fill third mold cavity 1536, second pin 1548 and third pin 1550 can be retracted. This retraction after the partial hardening of third material 1501 allows medial layer 1414 to remain centered within third mold cavity 1536 and for third material 1501 to evenly fill third mold cavity 1536. While not specifically shown and described, a similar method could be used to mold ball inner part 1414 around shell 1000.

While four pins 1546, 1548, 1550, 1552 are shown, and while they are shown protruding only from the sides of third mold cavity 1536, these features should not be seen as being limiting. In some embodiments, it may be desirable to place more or fewer pins in third mold cavity 1536. In other embodiments, it may be desirable to space the pins more evenly throughout third mold cavity 1536. Finally, it may be desirable to include pins on the top or bottom sides of third mold cavity 1536. A person having ordinary skill in the art will be able to modify the mold design to provide an appropriate molding environment based on the materials selected and the design characteristics desired.

Third mold 1530 may also be heated or at room temperature, depending on the material to be injected to form the cover. If third mold 1530 is heated, third mold 1530 may be allowed to cool. After third mold 1530 reaches room temperature or after the cover, medial layer 1414, core 1402, and shell 1000 have been allowed to cure for an appropriate amount of time, the formed ball may be removed from third mold 1530, such as by separating first mold portion 1532 from second mold portion 1534.

As noted earlier, the configuration of third mold interior wall 1545 may be designed to mold the outer surface of the ball. Accordingly, the interior wall 1545 may be patterned to allow for dimples and lands and other desirable markings to be molded into the cover of the ball. The precise configuration of the outer ball surface will depend on the desired ball characteristics. A person having ordinary skill in the art will be able to easily design the interior wall 1545 with desired characteristics in accordance with the ball's desired characteristics without undue experimentation. The pattern of dimples on the outside of the ball may be designed independently of the characteristics for the inner layers of the ball.

Figure 11:
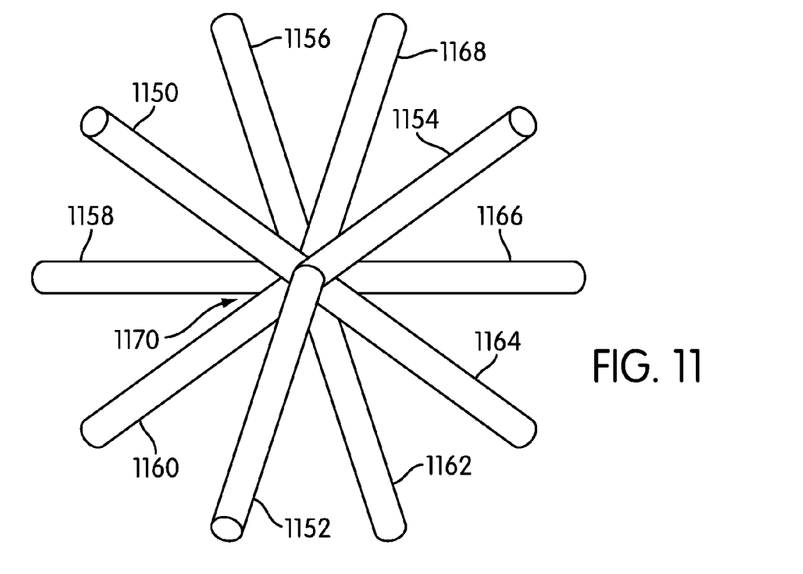
FIG. 11 is a perspective view of a plurality of another embodiment of inner mold surface creators placed adjacent one another to form an inner mold surface.
Figure 12:
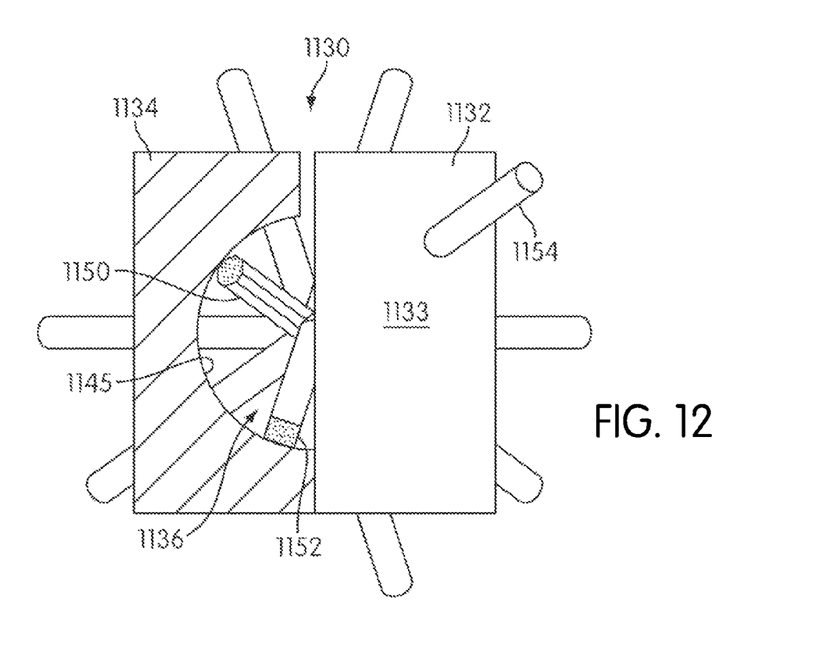
FIG. 12 is a view, partially in section, of the inner mold surface creators of FIG. 11 in position within a mold.
Figure 13:
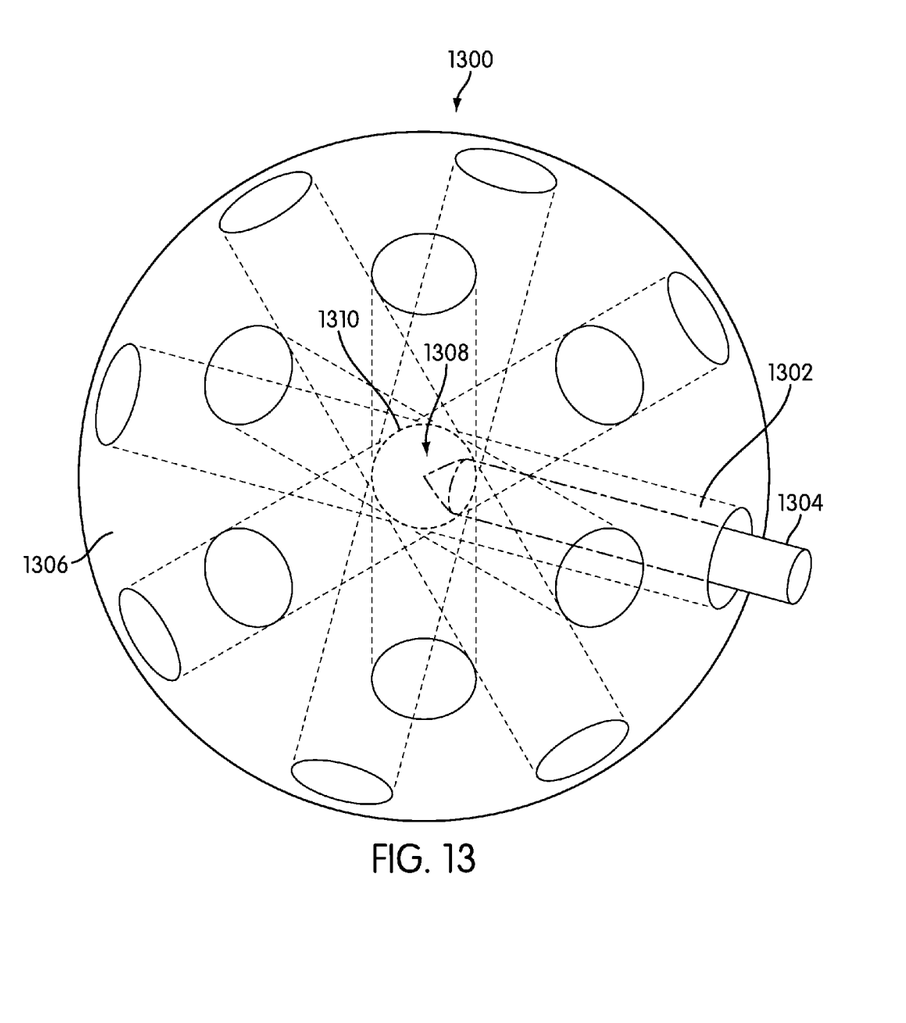
FIG. 13 is an embodiment of a hollow shell that may be made using the structures shown in FIGS. 11 and 12.

Alternative embodiments are possible for any of the steps shown and described above in connection with the method of making a shell and method of making a golf ball. In some embodiments, it may be desirable to make a perforated single-piece hollow shell without the use of an inner mold surface creator. The use of an inner mold surface creator that projects from a free end of a perforator allows for the creation of a perforated single-piece hollow shell that has perforations spaced from one another on both an inner and an outer surface of the shell. In other embodiments, spacing between the perforations, particularly on the inner surface, may be less important. In such an embodiment, a different method may be used to form a perforated single-piece hollow shell. An exemplary embodiment is shown in FIGS. 11-13. FIGS. 11 and 12 show a method and structure for making such a shell and FIG. 13 shows the shell made with such a method. Because this method and structure may be substituted for that shown in FIGS. 6 and 7 or that shown in FIGS. 8-10, and the structure made from this method can be used in the method and apparatus shown in FIGS. 14 and 15, it will be referred to as a first mold and analogous structures.

FIGS. 11 and 12 show the cooperation or combination of a plurality of perforators to create an inner mold surface. FIG. 11 shows the plurality of perforators by itself for clarity and FIG. 12 shows them positioned in a mold.

As shown in FIGS. 11 and 12, a mold 1130 is provided. Mold 1130 may be one of a variety of types of molds, depending on the material to be molded therein. In FIG. 12, first mold 1130 is shown as a standard injection mold. First mold 1130 may include first mold portion 1132 and second mold portion 1134. First mold portion 1132 and second mold portion 1134 can be separated from one another to place items in first mold 1130 before molding occurs or to remove the formed material after molding. First mold portion 1132 and second mold portion 1134 form first mold cavity 1136 therein. First mold 1130 includes first mold inner surface or wall 1145. Inner surface 1145 defines the outer shape of the item to be molded therein, as is typical of molds.

A plurality of perforators is inserted into mold 1130. In the embodiment shown in FIGS. 11 and 12, various perforators are partially or completely visible. These include first perforator 1150, second perforator 1152, third perforator 1154, fourth perforator 1156, fifth perforator 1158, sixth perforator 1160, seventh perforator 1162, eighth perforator 1164, ninth perforator 1166, and tenth perforator 1168. In the partial sectional view of FIG. 12, the position of these perforators is detailed. FIG. 12 is presented only in partial section to show, for example, the general appearance of a perforator exiting mold 1130. In FIG. 12, third perforator 1154 is shown projecting from an outer surface 1133 of mold 1130. Each perforator in each embodiment desirably projects from a corresponding outer surface of a corresponding mold or has an insertion and removal apparatus that is capable of causing the perforator to be inserted or removed from the mold. In some instances, an electronic insertion and removal system may be desirable. In other instances, a mechanical insertion or removal system may be desirable. In the embodiment shown in FIG. 12, the tolerances in molding of the hollow shell may be dependent on the proper mating of the free ends of the projections. Accordingly, a supplemental system that holds the perforators in place during molding incorporated into the mold or outside the mold may be desirable in order to ensure proper placement of the perforators. These structures are not specifically shown and may be selected from any of the structures that are known to a person having ordinary skill in the art.

The manner in which the perforators create an inner mold surface may be best understood from considering the hollow shell created, as shown in FIG. 13. FIG. 13 shows a hollow shell 1300 created from the process and structure shown in FIGS. 11 and 12. Each perforator creates one perforation shown in FIG. 13. To create the exemplary perforation 1302, an exemplary perforator 1304 enters the mold at the first mold surface. The first mold surface corresponds generally to outer surface 1306 of perforated single-piece hollow shell 1300. While perforator 1304 would not remain in shell 1300 after it is ejected from the mold, it is illustrated here for ease of understanding.

Perforator 1304 includes free end 1308. Free end 1308 is tapered. Each perforator 1304 is inserted into the mold to create a corresponding perforation 1302 in shell 1300. Each perforator 1304 and free end 1308 cooperates with the other perforators 1304 and free ends 1308 to form a solid shape where they meet. This area is shown as 1170 in FIG. 11 and forms void 1310 in the middle of shell 1300. These free ends 1308 are shaped and sized to contact the free end 1308 of at least one adjacent perforator 1304. As shown in FIG. 11, the free end of third perforator 1154 contacts at least the free end of second perforator 1152 and may contact the free ends of some or all of the other perforators. If all the perforators taper to meet at a single point in the center of mold 1130, all the perforators may contact all the other perforators. In other embodiments, some or all of the perforators may contact fewer than all the other perforators. This contact between the perforators effectively creates a solid surface in the center of mold 1130 and effectively creates an inner mold surface through the combined or cooperative action of the free ends of the perforators.

In some embodiments, it may be desirable to simplify the interfitting of the perforators. For example, it may be desirable in one embodiment for void 1310 to resemble a soccer ball. A soccer ball typically combines thirty-two panels to form a truncated isocahedron formed from twelve regular pentagon shapes and twenty regular hexagon shapes. A designer could create twenty perforators having a hexagonal cross section that have free ends that each taper to a point and twelve perforators having a pentagonal cross section that also have free ends that taper to a point. The taper of the free ends may be selected so that the free ends of the thirty two perforators meet at a central point and they interfit with one another to form a soccer ball shaped void in the center of the hollow shell. This selection of a shape may be well known and may be relatively easy for a person having ordinary skill in the art. If a greater or lesser number of perforators is desired, a designer can select an appropriate cross section of perforator to be used to create an appropriate central void. As noted, the central void 310 may be polygonal or spherical, depending on the desires of the designer, constraints of the materials used, and the like. The designer can select an appropriate taper for the free ends to create the desired shape, whether spherical or polygonal. FIG. 12 shows, for example that first perforator 1150 might be octagonal in cross section and second perforator 1152 might be square in cross section, and that the two different shapes may be used together in the same molding process.

FIGS. 11-13 do not show some of the structures shown in the earlier analogous FIGS., and other structures not shown in the analogous FIGS. are shown. It will be apparent to one of ordinary skill in the art that the structures shown in the earlier FIGS. may be used in this FIG. and the modifications shown in this FIG. can be applied to the structures in the previously disclosed embodiments.

For example, FIGS. 11 and 12 do not include the specific structures shown in earlier FIGS. to insert a material into a mold. These structures were eliminated from these FIGS. to provide greater clarity and show different features that were not shown in the earlier FIGS. However, in the structure and method shown in FIGS. 11 and 12, it is apparent that a material is inserted into first mold cavity 1136. The material is cured in an appropriate manner, as described in greater detail in connection with FIGS. 6-10 above. After the material is cured, the perforators are removed from mold 1130 and first mold portion 1132 and second mold portion 1134 may be separated from one another to eject perforated single-piece hollow shell 1300 as shown in FIG. 13.

While various embodiments of the invention have been described, the description is intended to be exemplary, rather than limiting and it will be apparent to those of ordinary skill in the art that many more embodiments and implementations are possible that are within the scope of the disclosure.

Accordingly, the disclosure is not to be restricted except in light of the attached claims and their equivalents. Also, various modifications and changes may be made within the scope of the attached claims.

What is claimed is:

1. A method of making a single-piece hollow shell, comprising:
   providing a mold having a first mold surface;
   inserting at least one perforator into a mold;
   actuating an inner mold surface creator to move an expansion area to an expanded position and to create at least a portion of an inner mold surface; and
   inserting a first material between the first mold surface and the inner mold surface.

2. The method of making a single-piece hollow shell according to claim 1, further comprising curing the first material.

3. The method of making a single-piece hollow shell according to clam 1, further comprising actuating the inner mold surface creator to cause the retraction of an expanded area.

4. The method of making a single-piece hollow shell according to claim 1, further comprising removing the at least one perforator from the mold.

5. The method of making a single-piece hollow shell according to claim 1, further comprising ejecting a formed shell from the mold.

6. The method of making a single-piece hollow shell according to claim 1, further comprising inserting a plurality of perforators into the mold.

7. The method of making a single-piece hollow shell according to claim 6, further comprising actuating a corresponding plurality of inner mold surface creators to cause corresponding expansion areas to move to their corresponding expanded positions.

8. The method of making a single-piece hollow shell according to claim 7, further comprising selecting and orienting each of the plurality of inner mold surface creators so that the inner mold surface creators together create a substantially continuous inner mold surface.

9. The method of making a single-piece hollow shell according to claim 7, further comprising selecting and orienting each of the plurality of inner mold surface creators so that the inner mold surface creators together create a substantially continuous spherical inner mold surface.

10. A method of making a single-piece hollow shell, comprising:
providing a mold having an inner surface;
inserting a plurality of perforators into a mold, each perforator having a free end being shaped and sized to contact a free end of at least one adjacent perforator; and
inserting a material into the mold.

11. The method of making a single-piece hollow shell according to claim 10, further comprising tapering the free end of at least one perforator.

12. The method of making a single-piece hollow shell according to claim 10, further comprising configuring the free ends of the perforators to interfit with one another.

13. The method of making a single-piece hollow shell according to claim 10, further comprising curing the material.

14. The method of making a single-piece hollow shell according to claim 13, further comprising removing the perforators.

15. The method of making a single-piece hollow shell according to claim 14, further comprising configuring the free ends of the perforators to interfit with one another to be capable of forming a substantially spherical void within the material being molded.

16. The method of making a single-piece hollow shell according to claim 14, further comprising configuring the free ends of the perforators to interfit with one another to be capable of forming a polygonal void within the material being molded.

17. A method of making a golf ball, comprising:
providing a first mold having a first mold surface;
inserting a movable molding surface into the first mold, the movable molding surface cooperating to create a second mold surface spaced from the first mold surface;
inserting a first material into the first mold between the first mold surface and the second mold surface;
curing the first material to form a single-piece perforated hollow shell;
inserting the shell into a second mold; and
inserting a second material into the second mold to interfit with the shell and form a golf ball inner part.

18. The method of making a golf ball according to claim 17, further comprising inserting the golf ball inner part into a third mold to cover the golf ball inner part with a cover.

19. The method of making a golf ball according to claim 17, further comprising tapering a free end of each movable molding surface.

20. The method of making a golf ball according to claim 17, further comprising actuating an inner mold surface creator on each movable molding surface to create the second mold surface.

* * * * *